United States Patent [19]

Ballou et al.

[11] 4,397,183

[45] Aug. 9, 1983

[54] APPARATUS FOR DETECTING LEVEL CHANGES IN DISTANCE

[75] Inventors: Edmund W. Ballou, Chicago, Ill.; Frederick L. Voelz, Munster, Ind.; Thomas A. Collins, Olympia Fields, Ill.

[73] Assignee: Atlantic Richfield Company, Philadelphia, Pa.

[21] Appl. No.: 251,613

[22] Filed: Apr. 6, 1981

[51] Int. Cl.³ .......................... G01F 23/08; G02B 5/08
[52] U.S. Cl. ........................................ 73/293; 73/317; 73/309; 250/227
[58] Field of Search ................. 73/293, 307, 308, 313, 73/305, 309, 319; 350/97; 250/227

[56] References Cited

U.S. PATENT DOCUMENTS

| | | | |
|---|---|---|---|
| 2,588,672 | 3/1952 | Turvey | 250/577 |
| 2,949,777 | 8/1960 | Ferron | 73/293 X |
| 3,314,292 | 4/1967 | Schulte et al. | 73/290 R |
| 3,940,608 | 2/1976 | Kissinger et al. | 250/227 |
| 4,064,754 | 12/1977 | Frey | 73/313 |
| 4,247,784 | 1/1981 | Henry | 73/293 X |
| 4,314,760 | 2/1982 | Hodge et al. | 250/227 X |

Primary Examiner—Daniel M. Yasich
Attorney, Agent, or Firm—Frank J. Uxa

[57] ABSTRACT

An apparatus useful in detecting changes in distance comprises: a signal emitter capable of emitting a substantially constant signal; a signal reflector capable of reflecting at least a portion of the substantially constant signal and being moveable in a substantially straight line direction toward or away from the emitter; and a signal receiver capable of receiving the reflected signal, whereby a change in the received signal is indicative of a change in the distance between the emitter and reflector. This apparatus is particularly useful in detecting changes in the amount of liquid in a liquid storage tank.

5 Claims, 6 Drawing Figures

APPARATUS FOR DETECTING LEVEL CHANGES IN DISTANCE

This invention relates to the art of detecting changes in distance. More particularly, this invention relates to detecting changes in the amount, e.g., mass, of liquid in liquid storage tanks.

Detecting small losses of liquid from a storage tank, e.g., an underground gasoline storage tank, can be very difficult. By way of illustrating this difficulty, consider a cylindrical tank half full of liquid containing about 4,000 gallons and oriented on its side having a length of 21.3 feet and a diameter of 8 feet. If one gallon were removed from such a tank, assuming all other relevant variables as to be discussed hereinafter, are held constant, the level of liquid measured relative to the lowest point of the tank would change from 4 feet to 3.9992 feet, i.e., a change in liquid level of $7.85 \times 10^{-4}$ feet.

Sunmark Industries, a division of Sun Oil Company of Pennsylvania, sells a leak detecting device which relies on the Principle of Buoyancy, i.e., the principle that a body suspended in a liquid is buoyed up by a force equal to the weight of liquid displaced by such a body. A sensor which extends from a sensitive, but rugged balance, and which is partially submerged in the tank fluid detects buoyancy changes corresponding to either an increase or a decrease in the total amount of liquid in a tank.

The Kent-Moore System is a method and apparatus for determining whether there are any leaks in a liquid storage container. One of the steps necessary in carrying out a determination of leaks is to pressurize and fill to excess a storage zone. Details concerning the experimental procedure are published by Kent-Moore Corporation for Model 1000, Tank System Tightness Tester. There are several problems in the Kent-Moore System which result in readings which are not stable.

One source of these problems involves gas bubbles which become trapped within a storage tank or zone. Since most storage tanks are not absolutely level, vapor pockets almost inevitably form as such a tank is filled to excess. Trapped gas bubbles tend to change in volume in response to changes in temperature and/or changes in pressure. During a typical Kent-Moore test, pressure is first increased and then decreased. Trapped gas bubbles first decrease and then increase in volume in response. Equilibrium of the final size of these bubbles requires that the atmosphere of gas within these bubbles reach a steady state, involving temperature and composition.

Another source of problems arises because the Kent-Moore System uses a pump that necessarily inputs energy into the gasoline tank. As a result of using such a pump, temperature equilibriation is very difficult to achieve. A small leak measured by the Kent-Moore System is the difference between a temperature change times the coefficient of expansion minus the volume lost by a leak.

During tests with the Kent-Moore System, it has been found that an observed volume often fluctuates in both a positive as well as a negative direction. This fluctuation is believed to result from changes in sizes of trapped bubbles.

In summary, the main difficulty of the Kent-Moore System involves the excess filling of the tank which leads to trapped gas bubbles. These gas bubbles, in turn, lead to variations in reading which are not necessarily representative of leaks.

An improved apparatus and method useful for detecting liquid leaks are disclosed in application Ser. No. 208,608 filed Nov. 20, 1980, now abandoned (continuation application Ser. No. 349,226 filed Feb. 16, 1982) which application is assigned to the assignee of the present application.

Clearly, apparatus and methods capable of easily detecting liquid leaks are both desirable and useful.

Therefore, one object of this invention is to provide an improved apparatus and method to detect changes in distance between two points.

A further object of this invention is to provide an improved method and apparatus to detect changes in the amount of liquid in a liquid storage tank. Other objects and advantages of the present invention will become apparent hereinafter.

An improved apparatus useful for detecting changes in distances has now been discovered. In one embodiment, this apparatus comprises a signal emitting means which is capable of emitting a substantially constant signal; and a signal reflecting means capable of reflecting at least a portion of the substantially constant signal from the signal emitting means to produce a reflected signal. The signal reflecting means is moveable relative to the signal emitting means in a substantially straight line direction toward or away from the signal emitting means. A signal receiving means is also included and is capable of receiving a portion of the reflected signal from the signal reflecting means. The signal receiving means is substantially stationary with respect to the signal emitting means. A change in the signal received by the signal receiving means is indicative of a change in the substantially straight line distance between the signal emitting means and the signal reflecting means.

The present apparatus provides significant benefits relative to the prior art. For example, the present apparatus provides for improved safety and also improved accuracy. In addition, the present apparatus is relatively easy to maintain.

In a preferred embodiment, the substantially constant signal emitted from the signal emitting means comprises light, more preferably infra-red light.

In another preferred embodiment, both the signal emitting means and the signal receiving means include fiber optic transmission means. Such transmission means, as will be described in detail hereinafter, may include conventional and well known fiber optic systems.

In an additional preferred embodiment, the present apparatus, as described above, further comprises monitoring means associated with the receiving means and capable of acting to monitor changes in the reflected signal received by the signal receiving means.

In another embodiment of the present invention, an apparatus useful for detecting changes in the amount, e.g., mass of liquid in a liquid storage tank comprises a signal emitting means capable of emitting a substantially constant signal. A signal reflecting means is provided which is capable of reflecting at least a portion of the substantially constant signal from the signal emitting means to produce a reflected signal. The signal reflecting means is movable relative to the signal emitting means in response to changes in the amount of liquid in the storage tank. Further, a signal receiving means is provided which is capable of receiving the reflected signal from the signal reflecting means. The signal receiving means is substantially stationary with respect to the signal emitting means. A change in the reflected signal received by the signal receiving means is indicative of a change in the amount of liquid in the storage tank. In one preferred embodiment, the substantially constant signal comprises light more preferably infrared light. Also, in a preferred embodiment, both the signal emitting means and the signal receiving means include fiber optic transmission means, e.g., as described herein. Preferably, the apparatus useful to detect changes in the amount of liquid further comprises monitoring means associated with the signal receiving means and capable of acting to monitor changes in the reflected signal received by the signal receiving means.

These and other aspects and advantages of the present invention are set forth in the following detailed description and claims, particularly when considered in conjunction with the accompanying drawings in which like parts bear like reference numerals.

Figure 1:
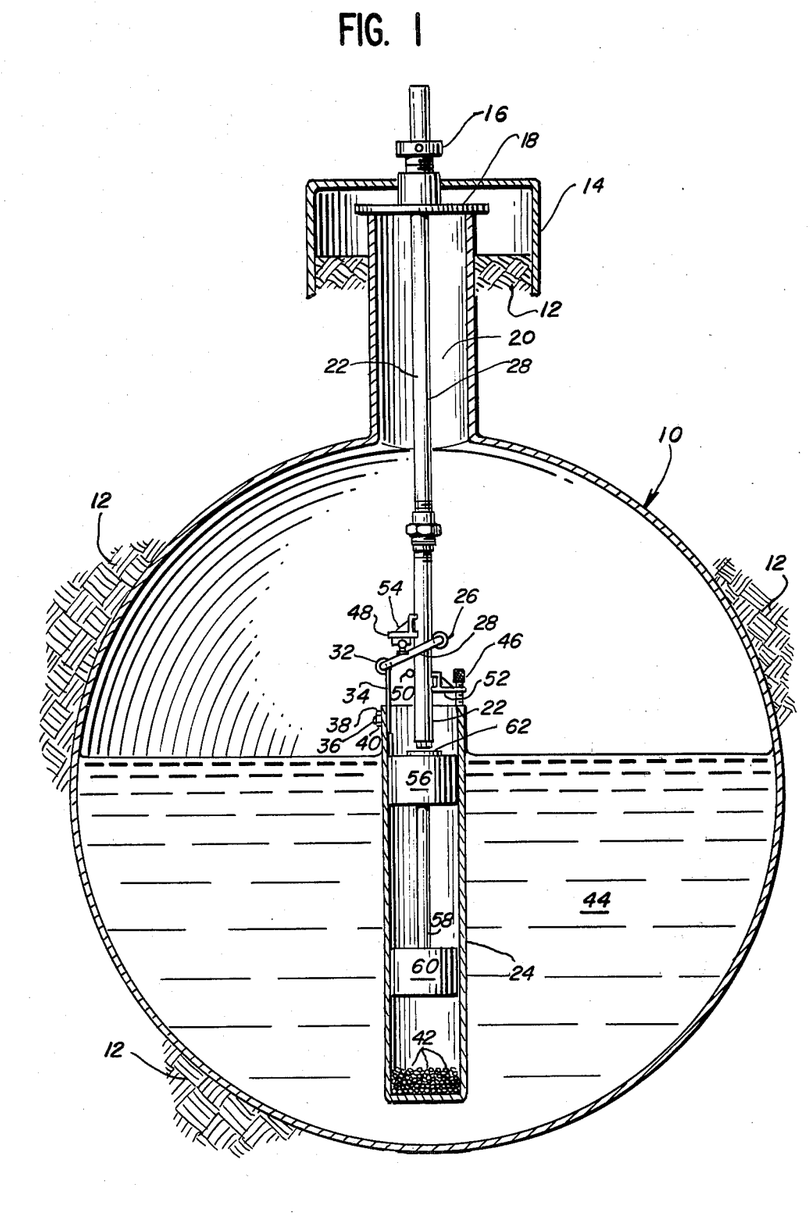
FIG. 1 shows a side elevation view, partially in cross-section, of a liquid storage tank containing an embodiment of an apparatus according to the present invention.
Figure 2:
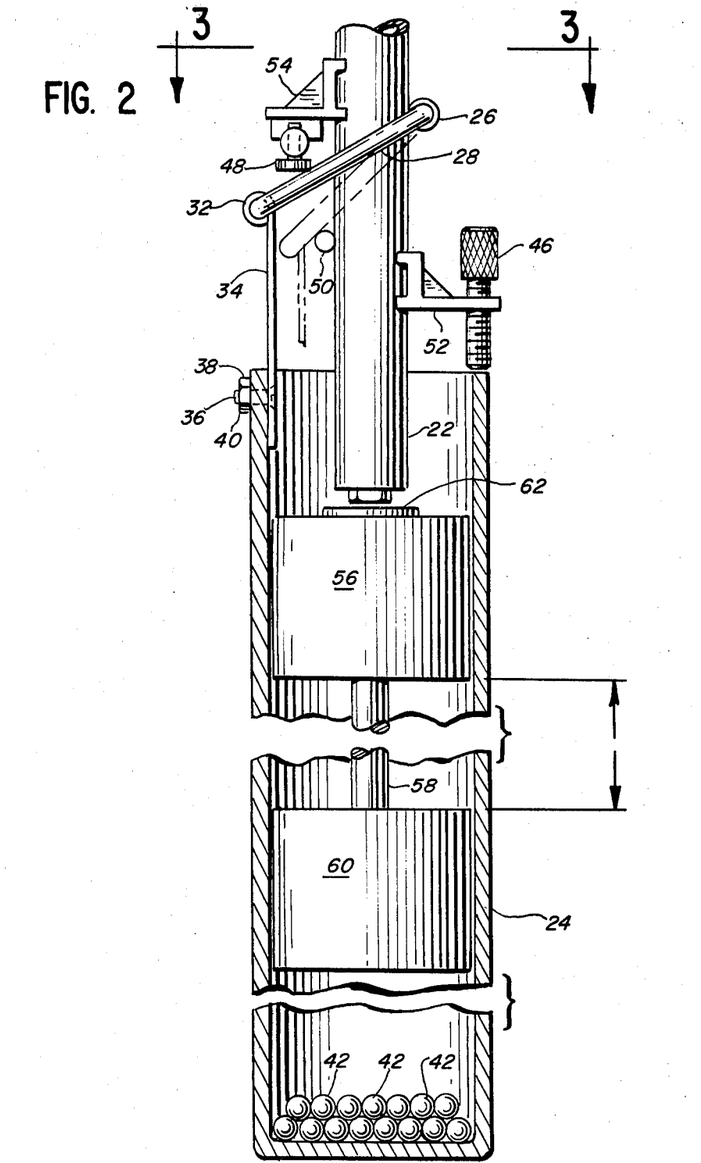
FIG. 2 shows an enlarged side elevation view, partially in cross-section, of a portion of the embodiment of the present apparatus shown in FIG. 1.
Figure 3:
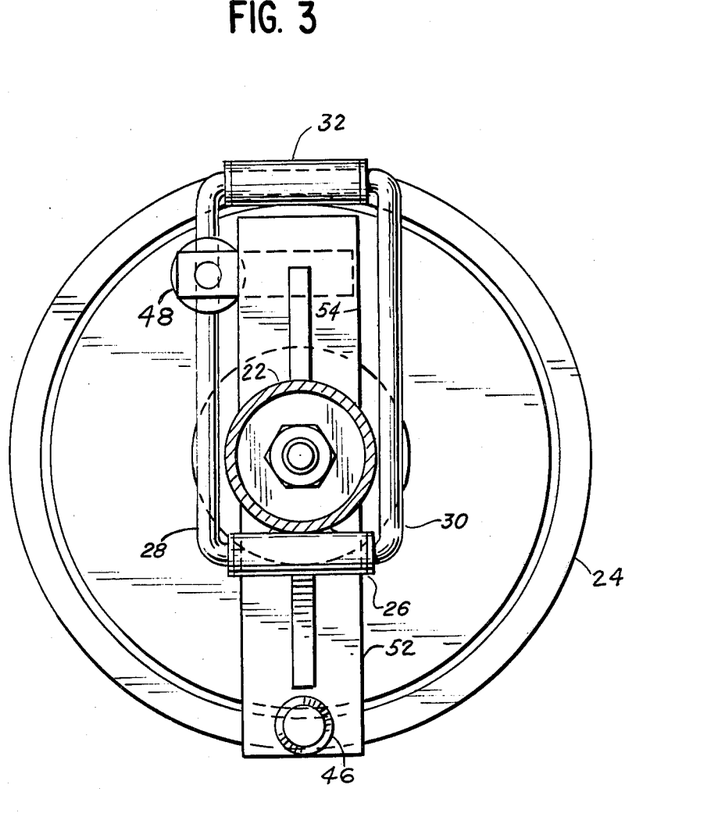
FIG. 3 is an elevation view taken along line 3—3 of FIG. 2.

Referring now to the drawings, FIG. 1 shows an underground liquid storage tank 10 in ground 12. Tank 10 includes a cover support 14, a height adjustment screw 16, cover plate 18 and a supply opening 20. Connected to height adjustment screw 16 is a tubular support 22. As best shown in FIGS. 2 and 3, float 24 is pivotally attached to tubular support 22 by the first tube 26 which is fixedly attached, e.g., welded, to tubular support 22, first and second rods 28 and 30 which fit matingly into the ends of first tube 26 and are allowed to pivot within first tube 26. First and second rods 28 and 30 each also fit matingly into the ends of second tube 32 and are allowed to pivot within second tube 32. Attachment rod 34 is attached, e.g., welded, to second tube 32 and extends downward into the space within float 24. Attachment rod 34 has a threaded peg 36 welded to it. Threaded peg 36 is placed through hole 38 in the wall of float 24 and secured there in place with nut 40. In this manner float 24 is pivotally secured or attached to tubular support 22.

Float 24 is capable of moving relative to tubular support 22. Float 24 includes weights 42 and maintains a substantially vertical orientation within liquid 44. It is possible, and preferable, by varying weights 42, to position float 24 at a depth so that changes in the level of liquid 44 due to temperature changes of liquid 44 will not cause float 24 to change its position. The depth required to make the position of float 24 substantially independent of changes in the temperature of liquid 44 and/or tank 10 will vary in response to the relative coefficients of thermal expansion for liquid 44, tank 10 and float 24. This depth is, in many instances, approximately equal to the volume of liquid in the storage tank divided by the free liquid surface area in the tank. A more detailed discussion of this "temperature independent" depth concept is presented in application Ser. No. 208,608 noted previously.

The movement of float 24 relative to tubular support 22 is limited in the upward direction by adjustable first and second upper stops 46 and 48, and in the downward direction by fixed lower stop 50, which is welded to tubular support 22.

First upper stop 46 is threadably fitted into first stop support 52 which, in turn, is welded to tubular support 22. Second upper stop 48 is threadably fitted into second stop support 54 which, in turn, is welded to tubular support 22. As float 24 moves upwardly relative to tubular support 22, contact is made between float 24 and first upper stop 46 and/or contact is made between first rod 28 and second upper stop 48. Preferably, the first and second upper stops 46 and 48 are adjusted so that these two contactings will take place substantially simultaneously when the axes of float 24 and tubular support 22 are parallel. In any event, when one or both of the first and/or second upper stops 46 and 48 is contacted as noted above the upward movement of the float 24 relative to tubular support 22 is stopped.

Lower stop 50 functions as follows. As float 24 moves downwardly relative to tubular support 22, first and second rods 28 and 30 also move downwardly with respect to tubular support 22 and eventually contact lower stop 50. This contact stops the downwardly movement of float 24.

Within the range of movement defined by the positions of first and second upper stops 46 and 48 and lower stop 50, float 24 is free to move relative to tubular support 22.

Fitted within float 24 is an elongated support member including an upper portion 56, a connecting rod 58 and a lower portion 60. This elongated support member functions as a platform for a polished mirror element 62 which is shown, in FIG. 2, as being supported on the top of upper portion 56. The general "dumbell" shape of the elongated support member aids in maintaining the substantially horizontal orientation of polished mirror element 62.

Figure 4:
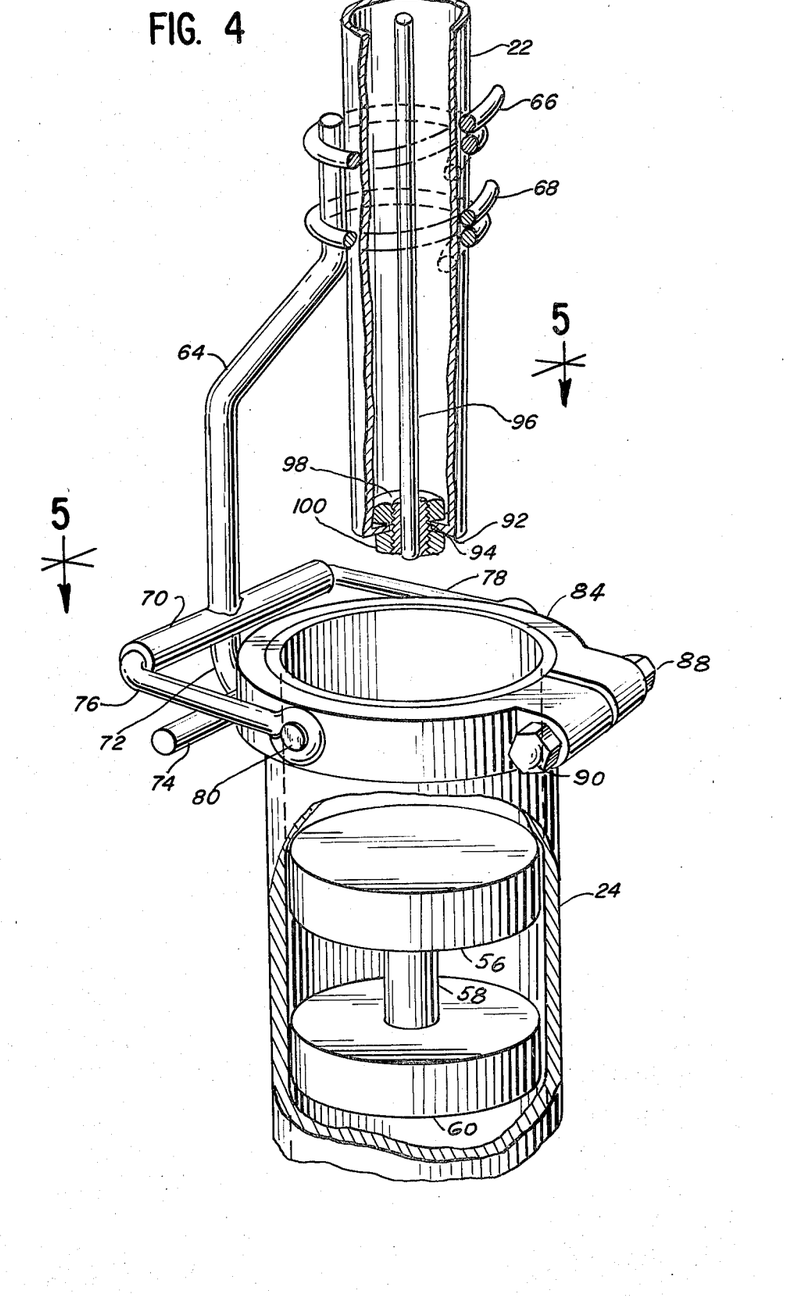
FIG. 4 is a front perspective view, partially in cross-section, of another embodiment of the present apparatus.
Figure 5:
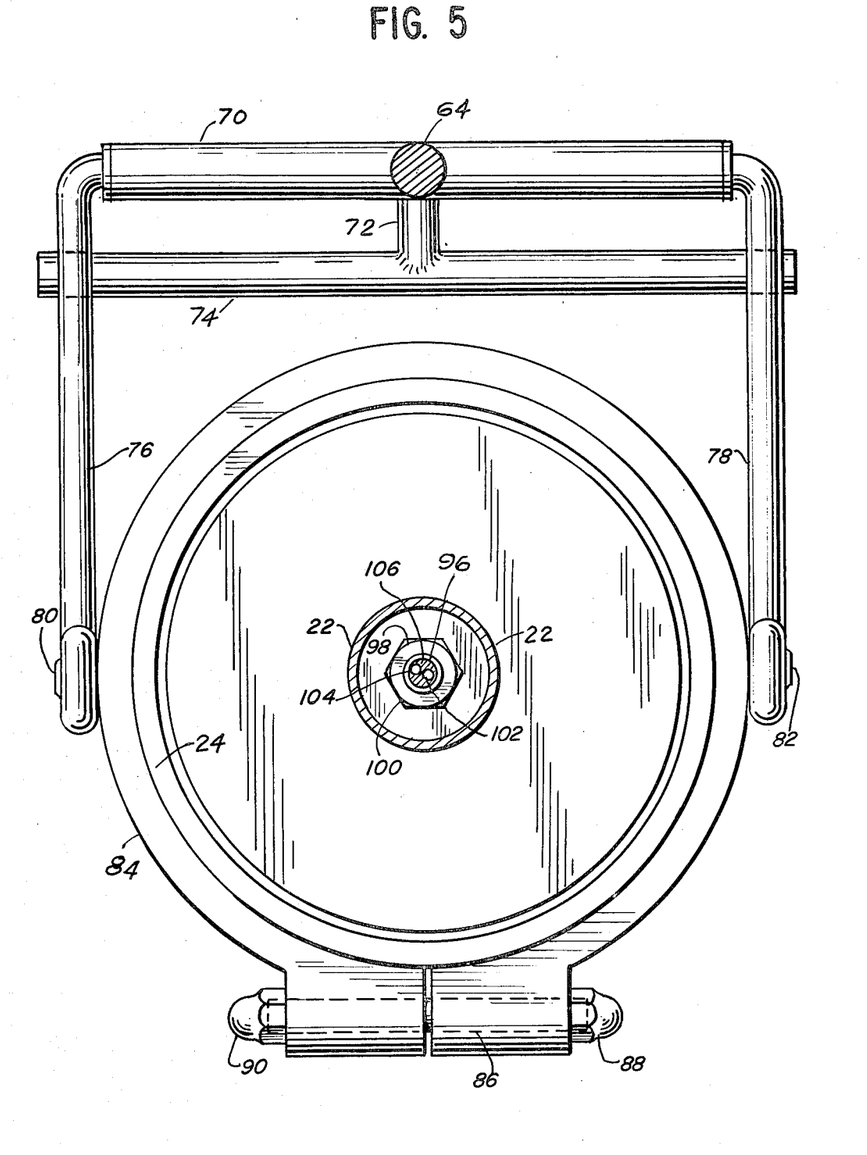
FIG. 5 is an elevation view taken along line 5—5 of FIG. 4.

Before detailing the internals of tubular support 22, refer to FIGS. 4 and 5 for an alternate approach to providing pivotal movement between tubular support 22 and float 24. Unless otherwise noted, the elements described in the embodiment illustrated in FIGS. 1, 2, and 3 are present in the embodiment shown in FIGS. 4 and 5 and perform substantially the same function in both embodiments. FIG. 4 has been drawn with the end of tubular support 22 a substantial distance from polished mirror element 62 in order to more easily and clearly see and describe the various elements. In use, the relative positions of tubular support 22 and mirror element 62 are more nearly as shown in FIG. 1.

Referring now to FIGS. 4 and 5, float 24 pivotably moves relative to tubular support 22 as follows. Angled support rod 64 is fixedly secured to tubular support 22 by first and second adjustable clamp elements 66 and 68. The end of angular support rod 64 away from tubular support 22 is welded to tube 70. Directly opposite this weld, a curved rod 72 is also welded to tube 70. The other end of curved rod 72 is welded to stop bar 74.

Tube 70 is pivotably secured to float 24 by means of first and second pivot rods 76 and 78 which are each fitted into one end of tube 70 and extend to and surround first and second pivot projections 80 and 82 respectively, which extend outward from collar 84. Collar 84 is fixedly secured to float 24 by means of threaded screw 86 and first and second capped nuts 88 and 90.

In the embodiment shown in FIGS. 4 and 5, float 24 is free to move downward relative to tubular support 22 until stop bar 74 contacts first and second pivot rods 76 and 78. In this embodiment there is no specific mechanism for controlling the upward movement of float 24 relative to tubular support 22.

The internals of tubular support 22 will be described with particular reference to FIGS. 4 and 5. However, unless otherwise noted such internals are identical in the embodiment shown in FIGS. 1, 2, and 3. Tubular support 22 has a bottom wall 92 which includes a central hole 94. A fiber optic cable 96 is placed in tubular support 22. Fiber optic cable 96 has a threaded metal terminus which extends out of hole 94. The terminus is set in place relative to hole 94 by means of nuts 98 and 100.

As shown in FIG. 5, fiber optic cable 96 includes a source fiber 102 and a receiver fiber 104. The remainder of the space within cable 96 is filled with packing 106. Fiber optic cable 96 may be of the type which is commercially available and well known in the art.

Figure 6:
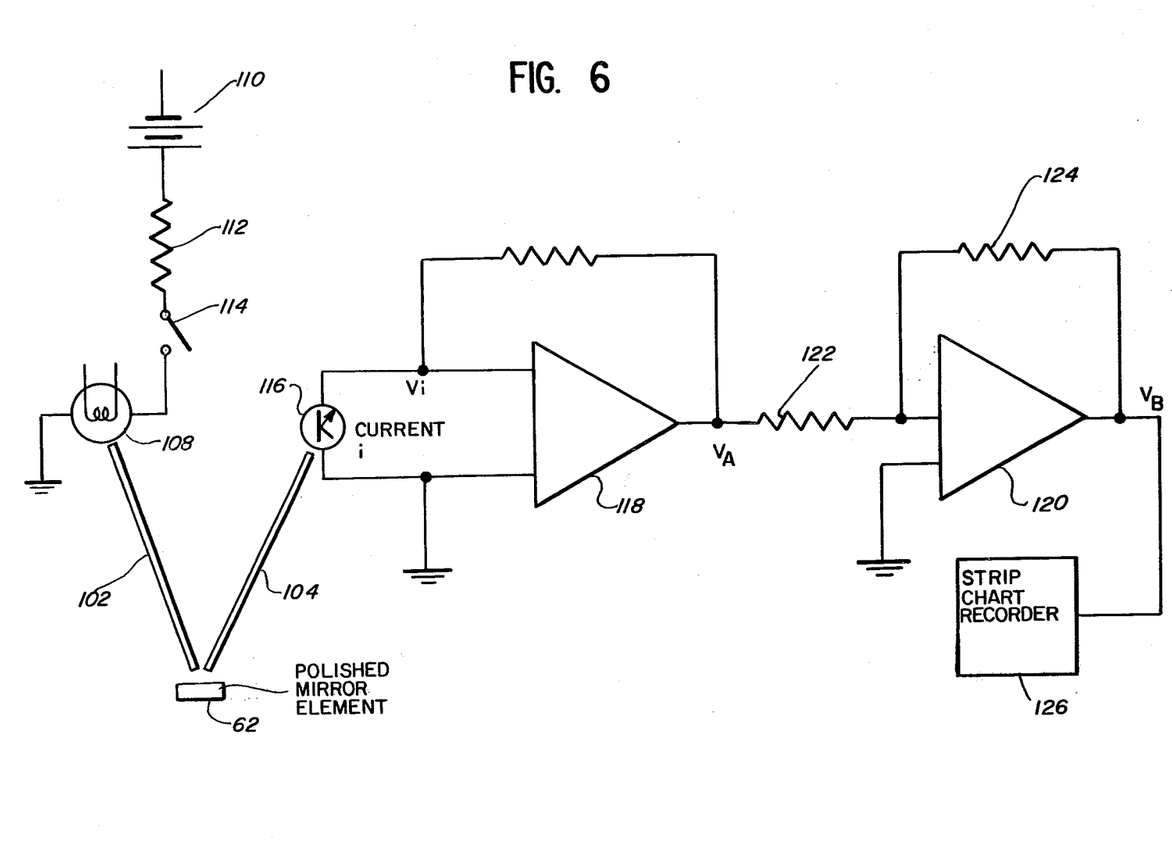
FIG. 6 is a schematic diagram of the electronic circuitry used to produce process and monitor the signals from the embodiments of the present apparatus shown in the preceding Figures.

FIG. 6 schematically describes the fiber optics and electronic aspects of the embodiments illustrated. FIG. 6 applies with equal weight to both embodiments described previously.

The source fiber 102 is provided with a constant infra red light signal to transmit to polished mirror element 62. This infra red light signal is developed by a light emitting diode 108 which is connected in series to a D.C. power source 110, a resistor 112 and an on-off switch 114. Polished mirror element 62 is movable relative to source and receiver fibers 102 and 104, respectively. Therefore, the intensity of the light reflected by polished mirror element 62 and received by receiver fiber 104 will vary depending on the position of polished mirror element 62.

In any event, receiver fiber 104 will receive an infra red light signal which has been reflected by polished mirror element 62 and will transmit such reflected signal to photodiode 116. The reflected light signal is converted in a photodiode 116 to a current, i, which is dependent on the intensity of the infra red light signal received by photodiode 116.

The current i is converted to a voltage $V_A$ by operational amplifier 118 wired in the standard ammeter configuration. The resulting voltage, $V_A$, is fed through the series resistor 122 to an operational amplifier 120 having feedback resistor 124. The desired relationship between $V_A$ and $V_B$ can be selected by choosing the proper series and feedback resistors 122 and 124. The voltage or potential, $V_B$, is related to the signal received by photodiode 116 which, in turn, is related to the intensity of the signal reflected by polished mirror element 62 which, in turn, is related to the distance between the polished mirror element 62 and the source and receiver fibers 102 and 104, respectively. Thus, by calibrating the value of $V_B$ with the distance between the polished mirror element 62 and the source and receiver fibers 102 and 104, one can readily determine and measure movement of the polished mirror element 62 and, in turn, changes in the amount of liquid 44 in storage tank 10. The value of $V_B$ can be monitored, e.g., on a conventional continuous strip chart recorder 126, to continuously monitor changes in the amount of liquid 44 in storage tank 10.

One particularly useful aspect of the present invention is determining the presence of liquid leaks in storage tanks. By monitoring and recording, either continuously or periodically, the voltage $V_B$, minor leaks of liquid 44 from storage tank 10 can be readily identified.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. An apparatus useful in detecting changes in the amount of liquid in a liquid storage tank comprising:
    a. signal emitting means capable of emitting a substantially constant signal;
    b. support means associated with said signal emitting means and acting to hold said signal emitting means substantially stationary;
    c. signal reflecting means associated with support means, said signal reflecting means being located at least partially within a float means which is connected to said support means, said float means being located at least partially in said liquid, said signal reflecting means reflecting at least a portion of said substantially constant signal from said signal emitting means to produce a reflected signal, said signal reflecting means being movably secured to said support means and being moveable in a substantially straight line direction toward or away from said signal emitting means in response to changes in the amount of liquid in said storage tank; and
    d. signal receiving means capable of receiving a portion of said reflected signal from said signal reflecting means, said signal receiving means being substantially stationary with respect to said signal emitting means, whereby a change in said signal received by said signal receiving means is indicative of a change in the amount of liquid in said storage tank.

2. The apparatus of claim 1 wherein said substantially constant signal comprises light.

3. The apparatus of claim 2 wherein said substantially constant signal comprises infra red light.

4. The apparatus of claim 1 wherein said signal emitting means and said signal receiving means both include fiber optic transmission means.

5. The apparatus of claim 1 which further comprises monitoring means associated with said signal receiving means and being capable of acting to monitor changes in said reflected signal received by said signal receiving means.

* * * * *

UNITED STATES PATENT AND TRADEMARK OFFICE
CERTIFICATE OF CORRECTION

PATENT NO. : 4,397,183

DATED : August 9, 1983

INVENTOR(S) : Edmund W. Ballou, et al.

It is certified that error appears in the above-identified patent and that said Letters Patent are hereby corrected as shown below:

Claim 1, line 16; delete the words "signal reflecting" and insert in place thereof ---float---.

Signed and Sealed this

Eleventh Day of October 1983

[SEAL]

Attest:

GERALD J. MOSSINGHOFF

Attesting Officer     Commissioner of Patents and Trademarks